(12) United States Patent
Suzuki et al.

(10) Patent No.: US 8,282,699 B2
(45) Date of Patent: Oct. 9, 2012

(54) FILTER UNIT PANEL AND METHOD OF MANUFACTURING THE SAME

(75) Inventors: Masatoshi Suzuki, Osaka (JP); Youzou Yano, Osaka (JP); Akio Suzuki, Osaka (JP)

(73) Assignees: Rohm Co., Ltd., Kyoto (JP); Ulvac, Inc., Kanagawa (JP)

( * ) Notice: Subject to any disclaimer, the term of this patent is extended or adjusted under 35 U.S.C. 154(b) by 346 days.

(21) Appl. No.: 12/743,112

(22) PCT Filed: Nov. 11, 2008

(86) PCT No.: PCT/JP2008/070521
§ 371 (c)(1),
(2), (4) Date: May 14, 2010

(87) PCT Pub. No.: WO2009/063875
PCT Pub. Date: May 22, 2009

(65) Prior Publication Data
US 2010/0251680 A1    Oct. 7, 2010

(30) Foreign Application Priority Data
Nov. 16, 2007    (JP) .................................. 2007-298674

(51) Int. Cl.
*B01D 46/00*    (2006.01)
(52) U.S. Cl. ...... 55/483; 55/484; 55/DIG. 5; 55/DIG. 31
(58) Field of Classification Search .................... 55/482, 55/483, 484, DIG. 5, DIG. 31
See application file for complete search history.

(56) References Cited

U.S. PATENT DOCUMENTS

| 6,349,015 B1 | 2/2002 | Hayashi |
| 6,846,342 B2 * | 1/2005 | Mertz et al. ...................... 55/486 |
| 7,753,981 B2 * | 7/2010 | Kawano et al. ................. 55/497 |

(Continued)

FOREIGN PATENT DOCUMENTS

JP    55-133217 U    9/1980
(Continued)

OTHER PUBLICATIONS

International Preliminary Report on Patentability for PCT/JP2008/070521, issued Jun. 29, 2010.*

*Primary Examiner* — Robert Clemente
(74) *Attorney, Agent, or Firm* — Hamre, Schumann, Mueller & Larson, P.C.

(57) ABSTRACT

The present invention improves a method of bonding by welding a plurality of filter units each having a frame body made of a resin member so as to provide a filter unit panel having excellent pressure resistance. This filter unit panel is obtained by disposing a plurality of filter units so that the outer peripheral surfaces of adjacent filter units (100a) and (100b) are partially in contact with each other but at least a part of the upper surfaces (11) and/or the lower surfaces (12) of the adjacent filter units are spaced apart from each other, and then melting a bonding resin so as to cause the melted bonding resin to flow into a gap (15) between the spaced upper surfaces and/or a gap (15) between the spaced lower surfaces and to cure. The bonding resin is supplied from, for example, protruding portions (10a) and (10b) of the frame body. This welding method increases the bonding strength between the filter units and increases the pressure resistance thereof accordingly.

9 Claims, 7 Drawing Sheets

U.S. PATENT DOCUMENTS

2008/0105126 A1   5/2008   Kawano et al.

FOREIGN PATENT DOCUMENTS

| | | |
|---|---|---|
| JP | 57-005829 U | 1/1982 |
| JP | 61-195316 U | 12/1986 |
| JP | 63-147628 U | 9/1988 |
| JP | 5-018622 U | 3/1993 |
| JP | 5-026127 U | 4/1993 |
| JP | 8-266842 A | 10/1996 |
| JP | 11-066808 | 3/1999 |
| JP | 2000-283545 A | 10/2000 |
| JP | 2002-239325 A | 8/2002 |
| JP | 2004-290913 A | 10/2004 |
| JP | 2004-351730 | 12/2004 |
| JP | 2005-074292 A | 3/2005 |
| JP | 2005-177641 A | 7/2005 |
| JP | 2008-119683 A | 5/2008 |

* cited by examiner

FILTER UNIT PANEL AND METHOD OF MANUFACTURING THE SAME

TECHNICAL FIELD

The present invention relates to filter unit panels used, for example, in air inlets of clean rooms, air conditioning equipment, gas turbines, and steam turbines.

BACKGROUND ART

An air filter is provided in each inlet of, for example, clean rooms, air conditioning equipment, gas turbines, and steam turbines. An air filter suitable for these purposes is a filter unit panel in which a plurality of filter units, each having a filter medium and a frame body for supporting it, are joined together with their outer peripheral surfaces being in contact with each other. JP 2005-177641 A discloses in FIG. 2 an example of a filter unit panel in which filter units are joined together.

In the filter unit panel disclosed in JP 2005-177641 A, filter units, each having a frame body (supporting frame) made of a resin member, are integrated into a single unit. This filter unit panel is suitable for reducing the weight of the panel itself.

DISCLOSURE OF THE INVENTION

In the case where filter units, each having a frame body made of a resin member, are used, the filter units can be joined together by bonding the frame bodies to each other by welding. In the case of welding, the filter units should be bonded to each other with a bonding resin that straddles the boundary between the continuous surfaces of the adjacent frame bodies rather than being placed between their outer peripheral surfaces. This type of welding, however, generally leads to poor bonding strength between the adjacent filter units, which hinders the resulting filter unit panel from having high pressure resistance.

It is an object of the present invention to improve a method of bonding a plurality of filter units each having a frame body made of a resin member by welding so as to provide a filter unit panel having excellent pressure resistance.

The present invention provides a filter unit panel including a plurality of filter units that are joined together. In this filter unit panel, each of the plurality of filter units includes a filter medium and a frame body that supports the filter medium, and the frame body is a resin member having an upper surface, a lower surface, an inner peripheral surface, and an outer peripheral surface. The upper surface is located upstream of the filter medium with respect to a flow of air passing through the filter medium and faces an upstream side of the air flow, the lower surface is located downstream of the filter medium with respect to the flow of the air passing through the filter medium and faces a downstream side of the air flow, and the inner peripheral surface supports the filter medium. The outer peripheral surfaces of the adjacent filter units are partially in contact with each other but at least a part of the upper surfaces and/or the lower surfaces of the adjacent filter units are spaced apart from each other, and a bonding resin enters a gap between the spaced upper surfaces and/or a gap between the spaced lower surfaces to bond the adjacent filter units to each other.

In another aspect, the present invention provides a method of manufacturing a filter unit panel including a plurality of filter units that are joined together. This method includes a step of preparing a plurality of filter units, each including a filter medium and a frame body that supports the filter medium. In this step, the frame body is a resin member having an upper surface, a lower surface, an inner peripheral surface, and an outer peripheral surface. The upper surface is located upstream of the filter medium with respect to a flow of air passing through the filter medium and faces an upstream side of the air flow, the lower surface is located downstream of the filter medium with respect to the flow of the air passing through the filter medium and faces a downstream side of the air flow, and the inner peripheral surface supports the filter medium. This method also includes a step of disposing the plurality of filter units so that the outer peripheral surfaces of the adjacent filter units are partially in contact with each other but at least a part of the upper surfaces and/or the lower surfaces of the adjacent filter units are spaced apart from each other, and then melting a bonding resin so as to cause the melted bonding resin to flow into a gap between the spaced upper surfaces and/or a gap between the spaced lower surfaces and to cure. The term "a melted resin" used in this description means not only a resin that is in a completely molten state but also a resin that is softened enough to flow.

In the present invention, the upper surfaces and/or the lower surfaces of the adjacent filter units are spaced apart from each other to form a gap (gaps) and the bonding resin is caused to flow into this gap to integrate the filter units with each other. Only considering the point of preventing the leakage of airflow, the adjacent filter units should be brought into as close contact with each other as possible for welding. However, if the filter units are in complete contact with each other, there is no space for the melted resin to enter therebetween, and therefore the pressure resistance of the panel is not improved sufficiently. If the resin is caused to flow into the gap between the spaced surfaces, not only is the pressure resistance of the panel improved, but also the resin that has flowed into the gap can prevent the leakage of airflow.

BEST MODE FOR CARRYING OUT THE INVENTION

Hereinafter, an embodiment of the present invention will be described as an example with reference to the accompanying drawings.

Figure 1:
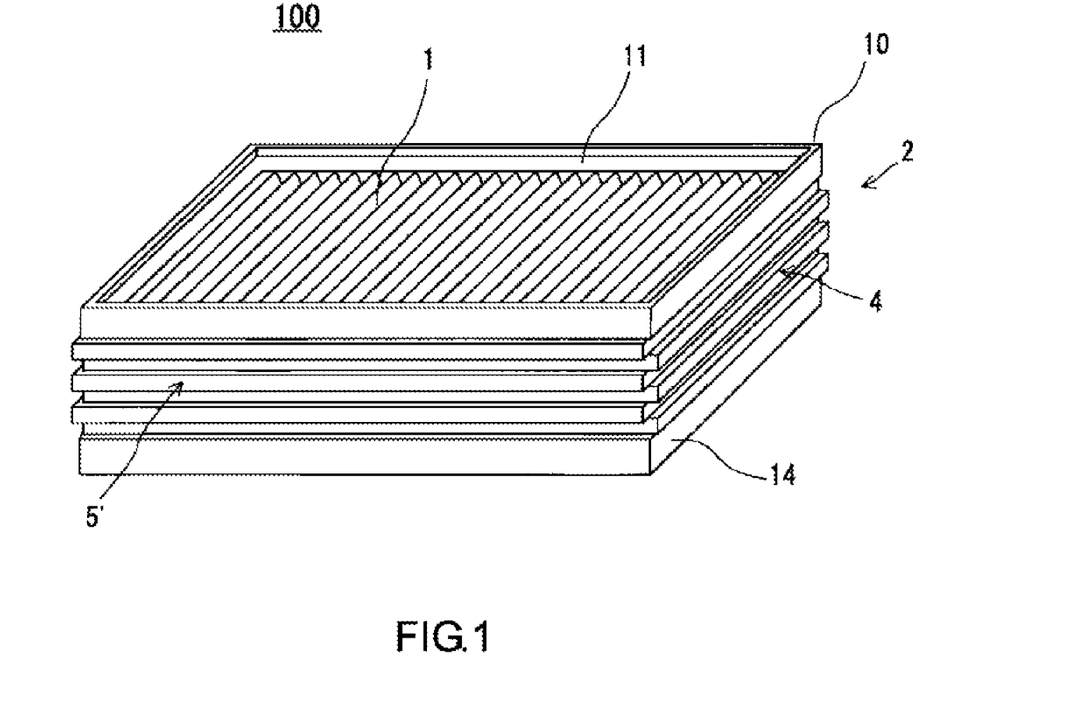
FIG. 1 is a perspective view showing an embodiment of a filter unit.

FIG. 1 is a perspective view of a filter unit as a component of a filter unit panel. A filter unit 100 includes a filter medium 1 and a frame body 2, and the peripheral portion of the filter medium 1 is supported by the frame body 2. The filter medium 1 is pleated (accordion-folded) to increase the filtration area. The filter medium 1 is rectangular in shape when viewed in plan (along the flow of air passing through the filter medium). The frame body 2 has a shape of a rectangular picture frame having inner and outer peripheries, each of which is rectangular in shape in plan view.

The frame body 2 is provided with engaging portions 4 and 5' formed on its outer peripheral surface 14. The engaging portions 4 and 5' each have convex portions (ridge portions) and concave portions (groove portions) that extend in the circumferential direction of the frame body and are arranged alternately in the height direction thereof. When a plurality of filter units 100 are integrated, the engaging portions 4 and 5' of each of the filter units 100 are engaged with the engaging portions of the adjacent filter unit 100.

Figure 2:
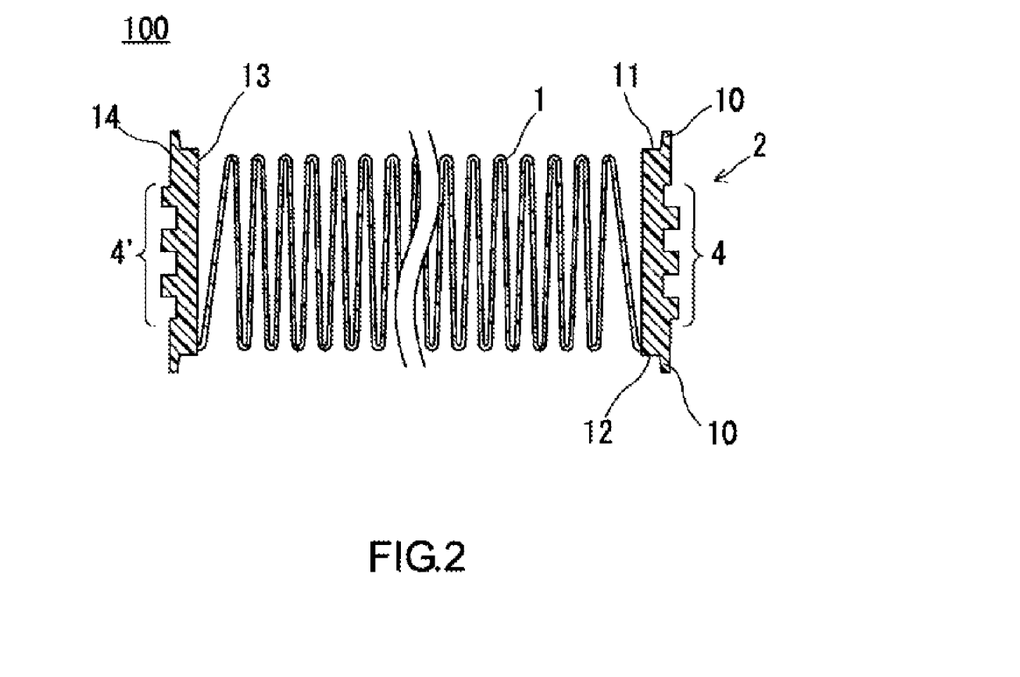
FIG. 2 is a cross-sectional view of the filter unit of FIG. 1.
Figure 3:
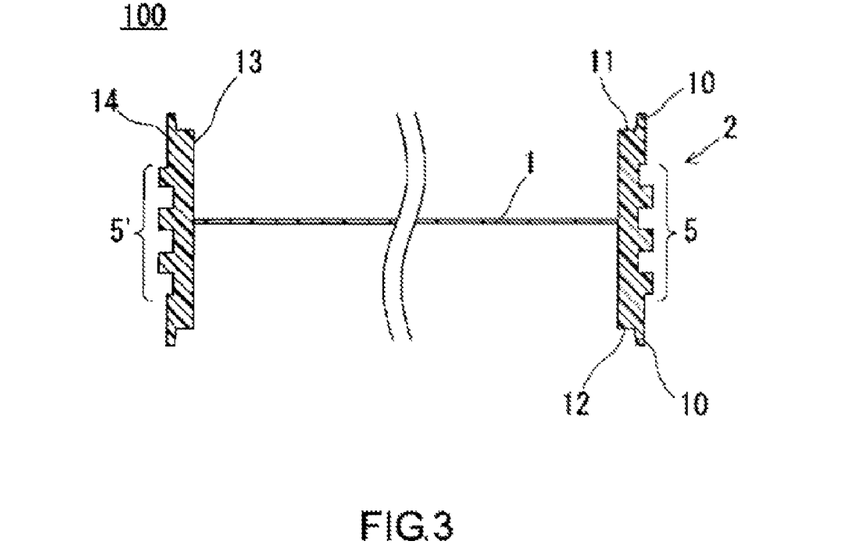
FIG. 3 is a cross-sectional view of the filter unit of FIG. 1 (as viewed from a direction orthogonal to the viewing direction of FIG. 2).

The filter unit is described further with reference to FIG. 1 as well as FIG. 2 (a cross-sectional view of the filter unit 100 taken along the direction in which the engaging portion 5' extends) and FIG. 3 (a cross-sectional view of the filter unit 100 taken along the direction in which the engaging portion 4 extends). The frame body 2 also is provided with an engaging portion 4' formed on the side of its outer peripheral surface 14 opposite to the side on which the engaging portion 4 is formed, across the filter medium 1. The engaging portion 4' is formed in the shape in which convex portions and concave portions are arranged inversely to those of the engaging portion 4 and therefore can be engaged with the engaging portion 4. Likewise, the frame body 2 also is provided with an engaging portion 5' formed on the side of its outer peripheral surface 14 opposite to the side on which the engaging portion 5' is formed, across the filter medium 1. The engaging portion 5 also is formed in the shape in which convex portions and concave portions are arranged inversely to those of the engaging portion 5' and therefore can be engaged with the engaging portion 5'. As just described, the frame body 2 has a pair of engaging portions 4 and 4' and a pair of engaging portion 5 and 5' respectively on the opposite sides of its outer peripheral surface 14 across the filter medium 1 in plan view.

Protruding portions 10 are formed on the upper surface 11 and the lower surface 12 of the frame body 2. Each of these protruding portions 10 has a wall that extends from the outer peripheral surface 14 of the frame body 2. These protruding portions 10 are formed to surround the frame body 2 on its upper surface 11 and lower surface 12 respectively. The protruding portions 10 serve as welding ribs to integrate the plurality of filter units 100 with each other.

The filter medium 1 is fixed to the inner peripheral surface 13 of the frame body 2. The filter medium 1 may be bonded to the frame body 2 with an adhesive, or may be fixed to the frame body 2 during the process of injection molding the frame body 2.

Hereinafter, how to combine the filter units 100 into a single panel is described. First, a plurality of filter units are prepared. The engaging portions 4 and 4'; 5 and 5' of the adjacent filter units 100a, 100b are engaged with each other with reference to the desired shape and size of the panel. The plurality of filter units 100a and 100b are locked and fixed to each other along the height direction of the frame bodies (see FIG. 4).

Figure 4:
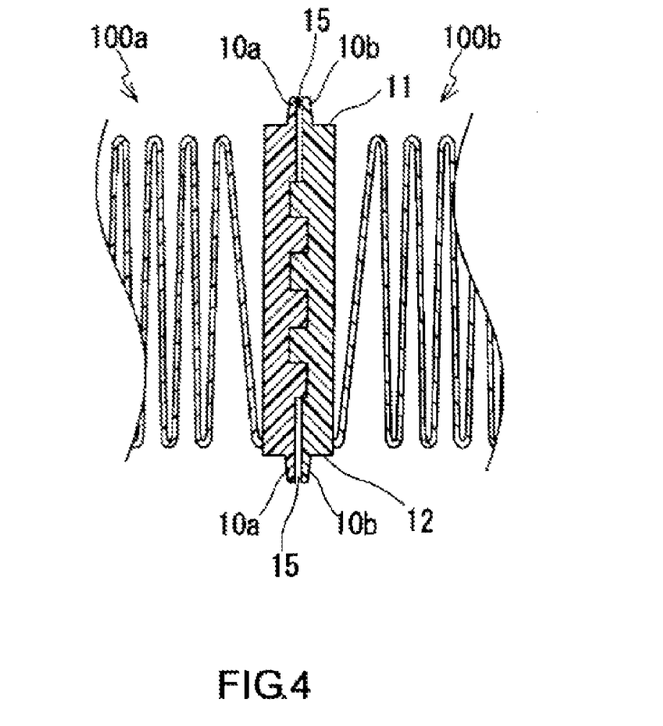
FIG. 4 is a cross-sectional view showing an example of a state in which engaging portions on outer peripheral surfaces of two filter units are engaged with each other.

As shown in FIG. 4, the engaging portions of the filter units 100a and 100b are engaged with each other, but gaps 15 are formed between the upper surfaces 11 and the lower surfaces 12 of the frame bodies. Each of these gaps 15 is a grooved portion (recessed portion) having a convex portion of the engaging portion (a convex portion nearest to the upper surfaces or the lower surfaces) as a bottom surface. The filter units 100a and 100b are designed to form the gaps 15 between the protruding portions 10a and 10b even when the convex portions of the engaging portion are inserted into the mating concave portions completely.

Figure 5:
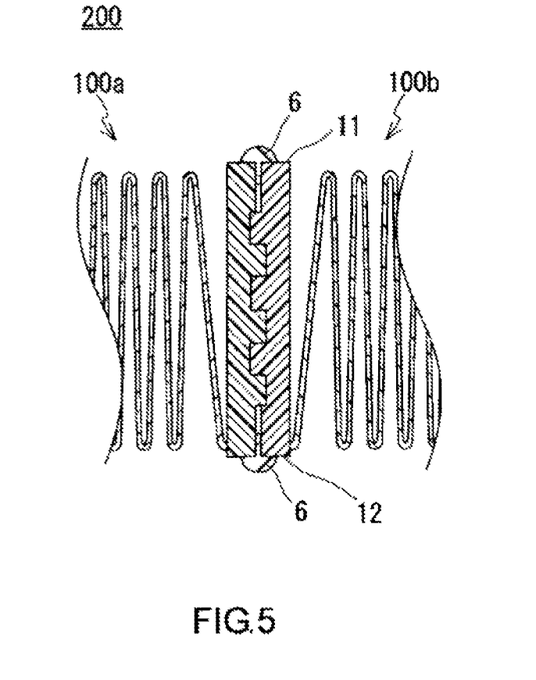
FIG. 5 is a cross-sectional view showing a state in which the two filter units shown in FIG. 4 are welded to each other.

Next, welding is performed using the protruding portions 10a and 10b of the adjacent frame bodies as welding ribs. The protruding portions 10a and 10b are melted and deformed to enter the gaps 15 between the adjacent frame bodies and to straddle the gaps between the upper surfaces 11 and the lower surfaces 12, and then cures in this state to serve as bonding resins 6 (see FIG. 5). A part of the bonding resin 6 enters the gap 15 between the frame bodies and increases the bonding strength between the filter units. A part of the bonding resin 6 enters the gap between the spaced upper surfaces (lower surfaces) and the other part thereof covers the spaced upper surfaces (lower surfaces) across the gap, and then the bonding resin 6 cures. Thus, the bonding resin 6 bonds the filter units 100a and 100b with sufficient strength. As just described above, it is preferable that the bonding resin 6 be formed to enter the gap between the spaced upper surfaces 11 and/or the spaced lower surfaces 12 and to straddle the gaps between the upper surfaces 11 and/or the lower surfaces 12.

Figure 11:
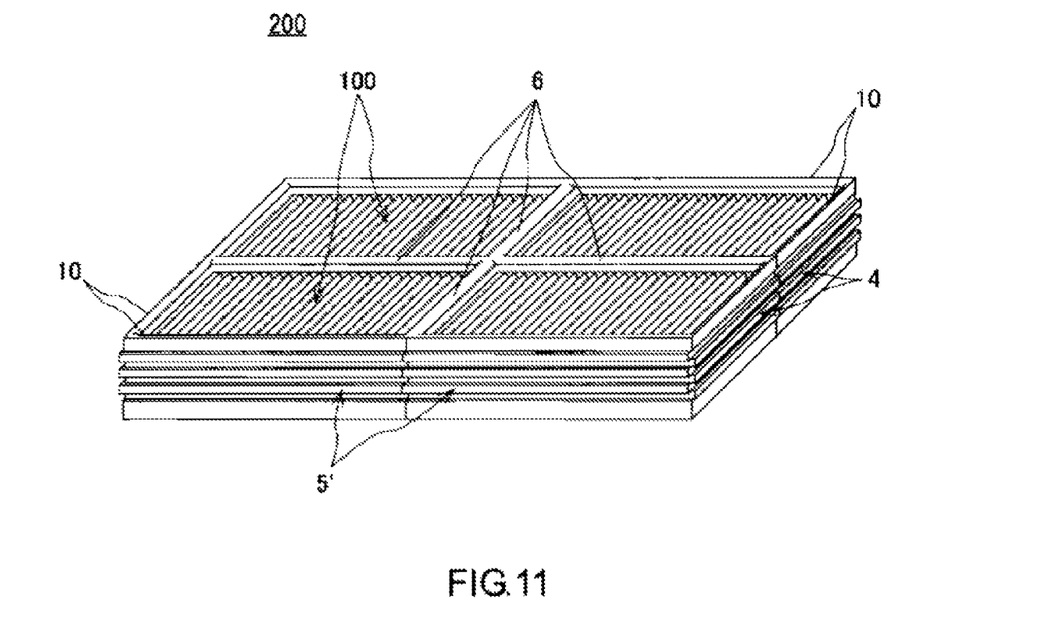
FIG. 11 is a perspective view showing a state (a panel) in which four filter units are joined together.

The filter units 100 also are fixed to each other by this welding in the circumferential direction of the frame bodies. Thus, as shown in FIG. 11, a filter unit panel 200, in which a plurality of (four in the example of FIG. 6) filter units 100 are integrated into a single unit with the outer peripheral surfaces thereof being in contact with each other, is fabricated. In the filter unit panel 200, the bonding resins 6 fill all the gaps (grooved portions) formed between the upper surfaces and the lower surfaces. The type of welding is not particularly limited. Ultrasonic welding, heat welding, laser welding may be used. Heat welding is preferred to ensure the flow of the resin into the gaps.

Figure 6:
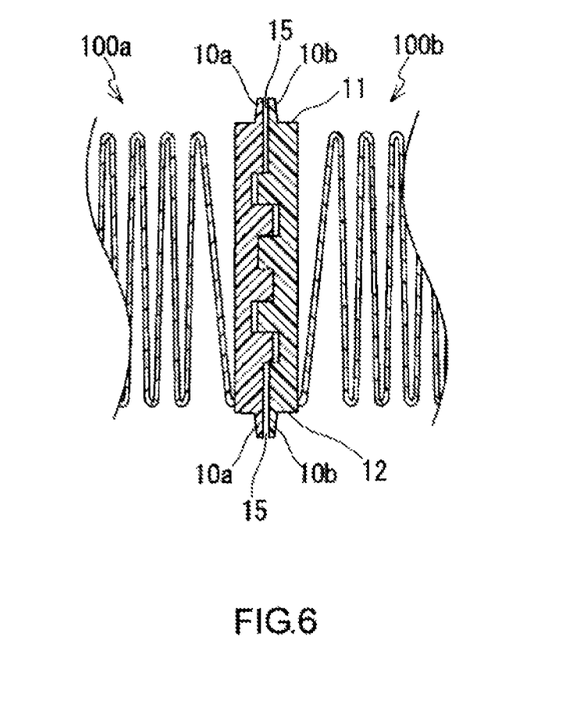
FIG. 6 is a cross-sectional view showing another example of a state in which engaging portions on outer peripheral surfaces of two filter units are engaged with each other.
Figure 7:
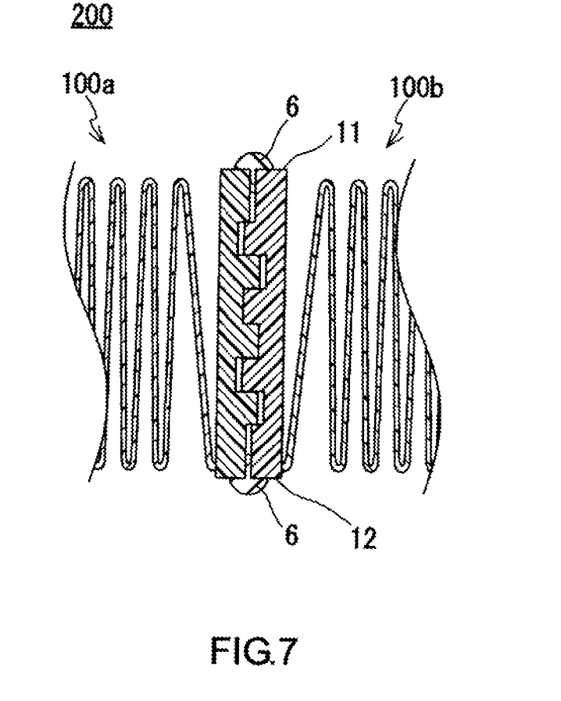
FIG. 7 is a cross-sectional view showing a state in which the two filter units shown in FIG. 6 or FIG. 8 are welded to each other.

The gaps 15 may be formed in such a way that the filter units are not in complete contact with each other. FIG. 6 shows the gap 15 that is formed in this way. The outer peripheral surfaces of the filter units 100a and 100b shown in FIG. 6 are brought into complete contact with each other (no gap is formed therebetween) when the convex portions of the engaging portions are inserted into the mating concave portions completely. However, the gaps 15 can be formed only by spacing these units apart slightly. FIG. 7 shows a state in which the filter units shown in FIG. 6 are welded to each other.

The resin material serving as the bonding resin 6 does not have to be formed previously as the protruding portion (welding rib) 10 on the frame body. It may be prepared separately.

Figure 8:
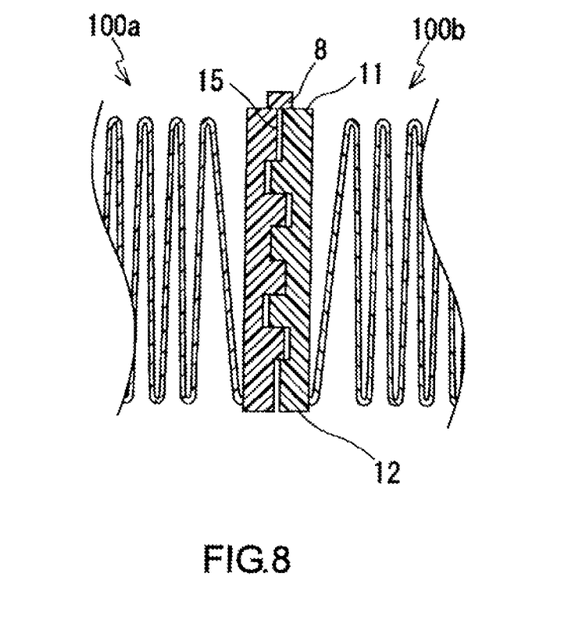
FIG. 8 is a cross-sectional view showing a still another example of a state in which engaging portions on outer peripheral surfaces of two filter units are engaged with each other, and a resin member placed for welding.

In this case, the resin member 8 to be used for welding is placed in the vicinity of the gap 15 (see FIG. 8). After the resin member 8 is melted, a part of the melted resin member enters the gap 15. As the resin member 8, a bar having a length in accordance with the length of the grooved portion 15 should be used. FIG. 8 shows a state in which the resin member 8 is placed only on the upper surfaces 11. In this case, after the welding using this member 8 is completed, the filter units are turned upside down so that the lower surfaces 12 are located above, and the lower surfaces 12 are welded using another resin member. In this way, the bonding resins 6 shown in FIG. 7 are formed.

The engaging portions 4, 4', 5, and 5' shown in the above embodiment not only facilitate positioning the filter units but also serve to increase the stiffness of the panel. Preferably, in the filter unit panel 200, the engaging portions having convex portions and/or concave portions are formed on the outer peripheral surfaces 14 of the adjacent filter units, and these adjacent filter units are bonded with these engaging portions being engaged in contact with each other.

In contrast to the above-described embodiment, if welding is performed with the filter units 100*a* and 100*b* being in close contact with each other with no gap therebetween (see FIG. 9 and FIG. 10), the bonding strength therebetween is relatively weak and sufficient pressure resistance cannot be maintained. This is because the bonding resins 6 are not present between the frame bodies of the filter units 100*a* and 100*b* although the resins 6 straddle the boundaries between the upper surfaces 11 and the lower surfaces 12 to integrate these filter units with each other.

In the embodiment described above, a plurality of filter units, each having the engaging portions 4, 4', 5, and 5' including convex portions and/or concave portions on its outer peripheral surface 14, are prepared, the adjacent filter units 100*a* and 100*b* are disposed with their engaging portions being engaged in contact with each other, and a bonding resin is melted so as to cause the melted bonding resin to flow into the gap between the spaced upper surfaces 11 and/or the gap between the spaced lower surfaces 12. In this way, a filter unit panel having high pressure resistance can be obtained reliably by causing the resin to flow into the gap between the units while utilizing the engaging portions.

The above also describes as an example an embodiment in which a plurality of filter units, each having a protruding portion 10 made of resin on the upper surface 11 and/or the lower surface 12 of its frame body, are prepared, and the protruding portion made of resin is melted so as to cause the melted protruding portion as a bonding resin to flow into the gap. In this embodiment, there is no need to place a separately-prepared resin member for welding.

The following describes, as another embodiment, a method of forming gaps by deforming frame bodies and causing resin to flow into the gaps to integrate the frame bodies with each other.

As described above, the filter unit 100 can be obtained by injection-molding the frame body 2. Injection molding is a technique that allows the formation of the frame body and the bonding of the filter medium to the frame body to be performed simultaneously, and thereby simplifies the manufacturing processes. In the filter unit obtained by injection molding, the peripheral portion of the filter medium 1 is embedded in (the inner peripheral surface of the frame body 2, and the resin that constitutes the frame body 2 penetrates into the peripheral portion of the filter medium.

During the injection molding process, the frame body 2 may be deformed in accordance with the shrinkage of the resin. Specifically, the frame body 2 is deformed in such a way that the outer peripheral surface 14 recedes toward the inner peripheral surface 13 gradually from the center portion to the end portions of each side of the frame body in a plan view (along the flow of air passing through the medium). This deformation can be reduced to a very low level if the shrinkage factor of the resin material, conditions of injection molding, etc. are chosen appropriately. However, if such deformation of the frame bodies is turned to advantage to cause the resin to flow into the gaps that are formed by this deformation, the pressure resistance of the resulting filter unit panel can be increased.

Figure 12:
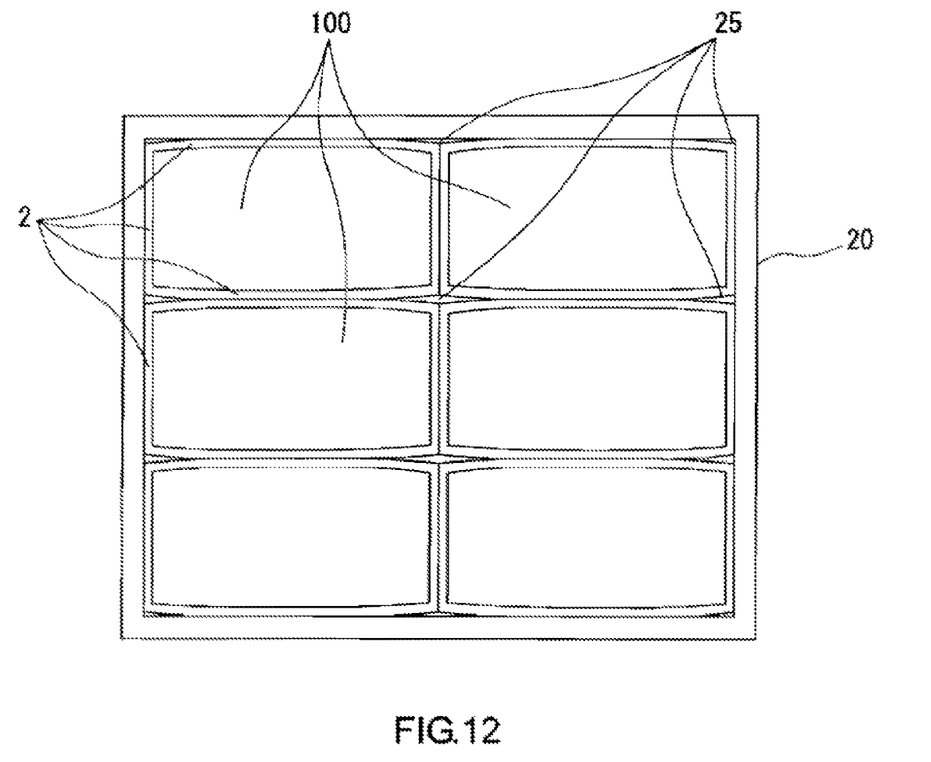
FIG. 12 is a plan view showing a state in which filter units, each being deformed from the center portion toward the end portions of each side thereof, are arranged, and an outer frame is disposed around the filter units.

As shown in FIG. 12, when the plurality of filter units 100, each having the frame body 2 that is deformed as described above, are disposed so that the outer peripheral surfaces of the frame bodies 2 are in contact with each other, the frame bodies 2 are in contact with each other at the center portion of each side but are spaced apart from each other at the end portions thereof. Therefore, gaps 25 are formed between the adjacent filter units 100, more specifically, in the vicinity of the end portions of each side of the frame bodies. If the outer frame 20 is disposed around the filter units 100, the gaps 25 also are formed between the filter units 100 and the outer frame 20. In the case where the frame body is formed in a rectangular shape having long and short sides as shown in FIG. 12, the deformation of the frame body appears more significantly in the long sides (that is, the long sides tend to be warped more than the short sides).

The melted bonding resin is caused to flow into the gaps 25 and to cure. The resin to be caused to flow into the gaps 25 may be supplied from the resin members placed on the gaps 25 or from the protruding portions (welding ribs) formed on the frame bodies.

The adjacent filter units 100 may be bonded to each other by welding at a portion where no gap 25 is formed therebetween, that is, where the frame bodies 2 are in contact with each other. Also in this case, the welding may be performed by melting resin members that are prepared separately from the filter units. The welding also may be performed by using, as welding ribs, the protruding portions formed on the filter units. Preferably, the outer frame 20 also is integrated with the filter units 100 by welding. In this case, for example, protruding portions similar to those of the filter units are formed on the outer frame 20 to perform the welding using these protruding portions as welding ribs.

In the embodiment that has been described with reference to FIG. 12, a plurality of deformed filter units, each in which the outer peripheral surface recedes toward the inner peripheral surface gradually from the center portion to the end portions of each side of the frame body when viewed along the flow of air passing through the medium, are prepared. These filter units are disposed so that the frame bodies of the adjacent filter units are in contact with each other at the center portions of their sides but are spaced apart from each other at the end portions thereof, and then resin is caused to flow into the gaps formed between the end portions of the adjacent filter units. This embodiment is suitable for the case where the filter units, each having a frame body that is formed by injection molded, are used.

Examples of the resin that constitutes the frame body 2 and the outer frame 20 include polyolefin resins, polyamide resins (including aromatic polyamide resin), polyurethane resins, polyester resins, polystyrene resins (such as ABS resin), and polycarbonate resins. Two or more of these resins may be used in combination, or different types of resins may be used for the frame body and the outer frame. A filler such as glass fiber or carbon fiber, a pigment, an antibacterial agent, or the like may be added to the resin.

Needless to say, the outer frame as illustrated in FIG. 12 also may be disposed around the filter unit panel shown in FIG. 11. The filter unit panel further may include an outer frame that surrounds the side surfaces of the filter units. The outer frame protects the filter units, increases the strength of the entire panel, and facilitates installing the filter unit panel.

As the filter medium 1, a meltblown nonwoven fabric, an electret filter, or the like may be used. Examples of the preferable filter medium 1 includes a laminate of a porous polytetrafluoroethylene (PTFE) membrane and an air-permeable fabric layer. The air-permeable fabric layer is composed, for example, of a polymeric fiber material. Glass fiber also is a well-known material for the filter medium 1. However, if a glass fiber layer is used, the incineration of such a filter medium is difficult.

Figure 13:
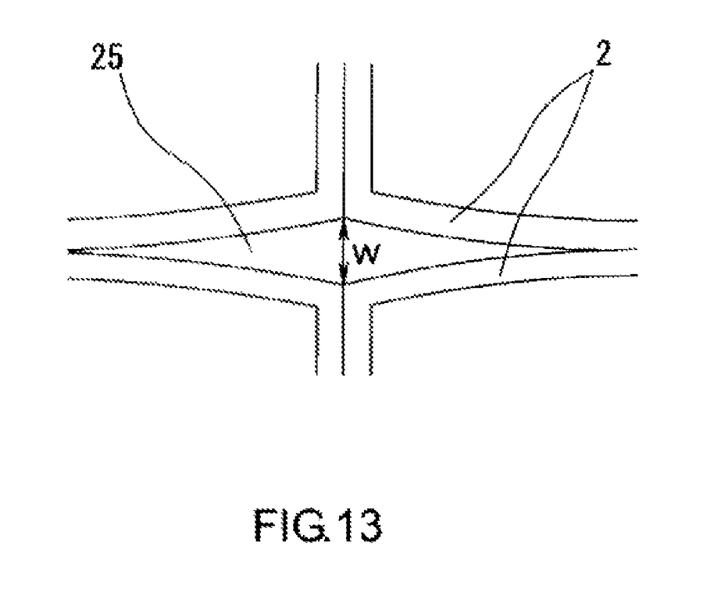
FIG. 13 is an enlarged view of the vicinity of the gap between the filter units shown in FIG. 12.

As described above, when the upper surfaces and/or the lower surfaces of the frame bodies are spaced apart from each other to cause resin to flow into the gaps formed therebetween, the bonding strength between the filter units is increased, and the pressure resistance also is increased accordingly. An excessively narrow gap makes it harder for the resin to flow thereinto, but an excessively wide gap rather makes it insufficient for the resin to bond the filter units. An appropriate gap width is 0.3 mm to 1.5 mm. Preferably, the protruding portion (welding rib) 10 has a height of 1 mm to 4 mm and a width of 1 mm to 2 mm. To be precise, the width of the gap 25 shown in FIG. 12 is determined by the length W shown in FIG. 13.

Hereinafter, the present invention is described further in detail with reference to Examples.

REFERENCE EXAMPLE

A laminate composed of a porous PTFE membrane and air-permeable fabric layers ("NTF9317-H01" manufactured by Nitto Denko Corporation) was pleated so that 95 pleats having a height of 27 mm were formed therein. The pressure drop of the filter medium composed of the above laminate was 170 Pa at an air flow rate of 5.3 cm/sec. On the other hand, a polycarbonate resin ("IUPILON" manufactured by Mitsubishi Engineering-Plastics Corporation) was cut to fabricate a frame body that accommodates the pleated filter medium. Like the frame body 2 shown in FIG. 1, engaging portions that extend in the circumferential direction of the outer peripheral surface of the frame body and protruding portions (welding ribs) that surround the filter medium on the upper and lower surfaces of the frame body were formed on the fabricated frame body. The outer dimensions of the frame body were 195 mm×295 mm with a thickness (height) of 30 mm. The height and width of the protruding portions were 2 mm and 1.5 mm respectively. The filter medium was fixed within the frame body with an adhesive ("PPX" manufactured by Cemedine Co., Ltd.). Thus, a filter unit having a shape as shown in FIG. 1 was obtained.

Figure 9:
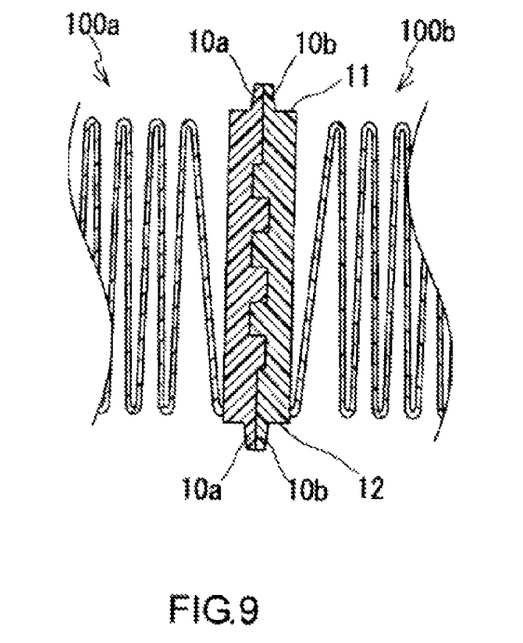
FIG. 9 is a cross-sectional view showing an example of a state in which engaging portions on outer peripheral surfaces of two filter units are engaged with each other and the outer peripheral surfaces are in close contact with each other (there is no gap for a bonding resin to flow thereinto).
Figure 10:
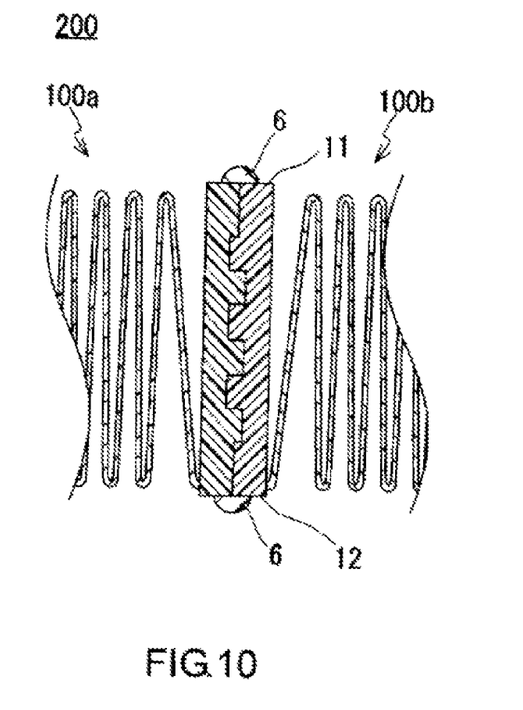
FIG. 10 is a cross-sectional view showing a state in which the two filter units shown in FIG. 9 are welded to each other.

The engaging portions of the filter units thus obtained were engaged with each other so that 2×3 filter units were arranged in a matrix and joined together with each other. As shown in FIG. 9, the filter units were disposed so that the outer peripheral surfaces of the adjacent frame bodies and the walls of the protruding portions thereof were in complete contact with each other. Next, the upper surfaces and the lower surfaces of the frame bodies were subjected sequentially to heat welding in which the adjacent protruding portions were heated to be melted. Thus, the filter units were integrated into a single filter unit panel. Bonding resins as shown in FIG. 10 were formed on the filter unit panel thus obtained.

An outer frame further was disposed entirely around the integrated filter units. The outer frame was composed of four bar members obtained by extruding the same polycarbonate resin ("IUPILON") as was used for the frame bodies, and protruding portions serving as welding ribs were formed on the inner surfaces of the respective bar members. In the boundary between the outer frame and each of the filter units, the protruding portions of the outer frame and the protruding portions of the filter unit were in contact with each other. Subsequently, heat welding was performed using these protruding portions as welding ribs to integrate the outer frame and the filter units with each other. The adjacent bar members of the outer frame also were integrated with each other by heat welding using the protruding portions of the bar members as welding ribs. Thus, a filter unit panel (i.e., an air filter) equipped with an outer frame was obtained.

Example 1

An air filter was obtained in the same manner as in Reference Example except that the cross-sectional shape of each frame body was changed so that 0.5-mm wide gaps (grooved portions) were formed between the upper surfaces and between the lower surfaces of the adjacent frame bodies when the filter units were disposed with the engaging portions being in engaged with each other completely. The gaps were formed along the entire length of the adjacent frame bodies. The height and width of the protruding portion also were the same as those in Reference Example. In Example 1, the cross section of the filter units that had not yet been welded was the same as that in FIG. 4, and the cross section of the filter units that had been welded was the same as that in FIG. 5.

Example 2

An air filter was obtained in the same manner as in Reference Example except that the filter units were spaced apart slightly from each other so that 0.5-mm wide gaps were formed between the upper surfaces and between the lower surfaces of the adjacent frame bodies. In Example 2, the cross section of the filter units that had not yet been welded was the same as that in FIG. 6, and the cross section of the filter units that had been welded was the same as that in FIG. 7.

Example 3

An air filter was obtained in the same manner as in Example 2 except that frame bodies without protruding portions were used and polycarbonate resin members were disposed on the gaps and welding was performed (in this example, the width of the gaps between the upper surfaces and between the lower surfaces of the frame bodies were 0.5 mm). Each of the resin members that were prepared to be disposed on the gaps had a cross-sectional area of about 1 $mm^2$ and a length long enough to cover the entire length of the gap. These resin members also were obtained from the same polycarbonate resin ("IUPILON") as was used for the frame bodies. In Example 3, the cross section of the filter unit that had not yet been welded was the same as that in FIG. 8, and the cross section of the filter units that had been welded was the same as that in FIG. 7.

Example 4

A filter medium obtained in the same manner as in Reference Example was set in a mold of an injection molding machine, and a polycarbonate resin (the above-mentioned "IUPILON") was injection-molded to form a frame body and to fix the filter medium to the frame body. Thus, a filter unit having outer dimensions of 195 mm×295 mm with a thickness of 30 mm was obtained. The frame body of the filter unit was warped slightly in such a way that the long sides thereof receded gradually from their center portions to the end portions. Therefore, the frame body receded by about 0.2 to 0.3 mm at the end portions of its longer sides from the center portions. Engaging portions were formed on this frame body but the protruding portions were not provided thereon, as in Example 3.

The engaging portions of the filter units thus obtained were engaged with each other so that 2×3 filter units were arranged in a matrix. Then, an outer frame that had been prepared in the same manner as in Reference Example was disposed. As shown in FIG. 12, gaps were formed between the filter units and between the outer frame and the respective filter units. In this state, plate-like resin members made of the same polycarbonate resin (the above "IUPILON") as was used for the frame body and having a thickness of 1 mm were placed on the boundaries between the filter units and the boundaries between the outer frame and the respective filter units, and heat welding was performed to melt these resin members. As the resin members, resin members of 1 mm wide and 195 mm long and resin members of 1 mm wide and 295 mm long were prepared, and these resin members were placed to cover the above boundaries entirely. Heat welding was performed sequentially on the front and back sides of the filter units. Thus, an air filter, in which all of the above gaps were covered on both the front and back sides (a part of the gaps still remained as hollow portions), was obtained.

Figure 14:
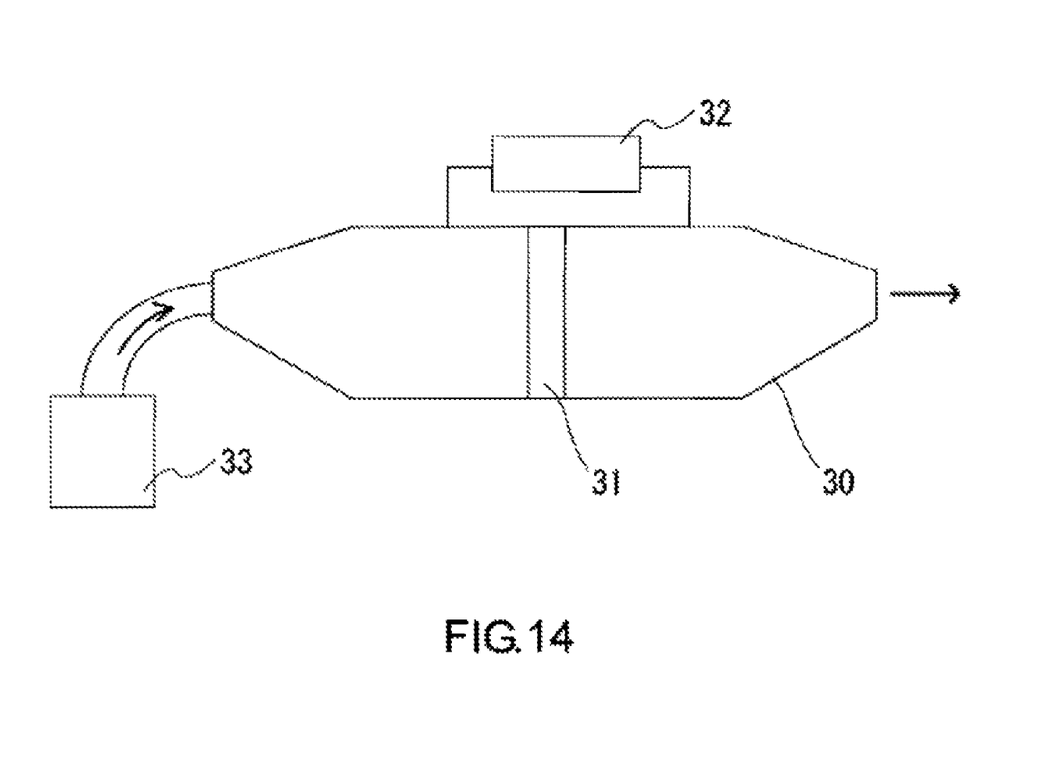
FIG. 14 is a diagram showing a configuration of an apparatus used to measure withstand pressures in Examples.

The air filters obtained in Reference Example and Examples 1 to 4 were subjected to a pressure test using an apparatus shown in FIG. 14. An air filter 31 is placed in a pressure-resistant container 30 of this apparatus, and air was blown into the container 30 from a fan blower 33. The blowing of air was continued until the air filter 31 was broken while measuring the differential pressure between the upstream side of the air filter 31 and the downstream side thereof with a differential pressure gauge 32. The differential pressure at which the air filter 31 was broken was determined as a withstand pressure. In this test, the withstand pressure was measured while increasing the differential pressure by 100 Pa in a stepwise manner. Table 1 shows the results of the above measurements. Table 1 shows the results of the above measurements.

TABLE 1

|  | Ref. Example | Example 1 | Example 2 | Example 3 | Example 4 |
|---|---|---|---|---|---|
| Withstand pressure (Pa) | 400 | 1000 | 1000 | 1200 | 1500 |

When welding was performed by utilizing the gaps between the filter units, the withstand pressure of the air filter in each Example was at least twice as high as that in Reference Example.

The filter unit panel of the present invention is suitable for air filters used in air inlets of, for example, clean rooms, air conditioning equipments, gas turbines, and steam turbines.

The invention claimed is:

1. A filter unit panel comprising a plurality of filter units that are joined together,
   wherein each of the plurality of filter units includes a filter medium and a frame body that supports the filter medium, the frame body being a resin member having an upper surface, a lower surface, an inner peripheral surface, and an outer peripheral surface, the upper surface being located upstream of the filter medium with respect to a flow of air passing through the filter medium and facing an upstream side of the air flow, the lower surface being located downstream of the filter medium with respect to the flow of the air passing through the filter medium and facing a downstream side of the air flow, and the inner peripheral surface supporting the filter medium, and
   the outer peripheral surfaces of the adjacent filter units are partially in contact with each other but at least a part of the upper surfaces and/or the lower surfaces of the adjacent filter units are spaced apart from each other, and a bonding resin enters a gap between the spaced upper surfaces and/or a gap between the spaced lower surfaces to bond the adjacent filter units to each other.

2. The filter unit panel according to claim 1, wherein the bonding resin is formed to enter and straddle the gap between the spaced upper surfaces and/or the gap between the spaced lower surfaces.

3. The filter unit panel according to claim 1, wherein an engaging portion including a convex portion and/or a concave portion is formed on the outer peripheral surface, and the adjacent filter units are bonded to each other with their engaging portions being engaged in contact with each other.

4. The filter unit panel according to claim 1, wherein
   in each of the frame bodies of the adjacent filter units, the outer peripheral surface recedes toward the inner peripheral surface gradually from a center portion to end portions of each side of each frame body in such a way that the frame bodies are in contact with each other at their center portions but are spaced apart from each other at their end portions, and
   the bonding resin enters the gap between the upper surfaces spaced apart at the end portions and/or the gap between the lower surfaces spaced apart at the end portions.

5. The filter unit panel according to claim 1, further comprising an outer frame that surrounds side surfaces of the plurality of filter units.

6. A method of manufacturing a filter unit panel including a plurality filter units that are joined together, the method comprising the steps of:
   preparing a plurality of filter units, each including a filter medium and a frame body that supports the filter medium, the frame body being a resin member having an upper surface, a lower surface, an inner peripheral surface, and an outer peripheral surface, the upper surface being located upstream of the filter medium with respect to a flow of air passing through the filter medium and facing an upstream side of the air flow, the lower surface being located downstream of the filter medium with respect to the flow of the air passing through the filter medium and facing a downstream side of the air flow, and the inner peripheral surface supporting the filter medium; and
   disposing the plurality of filter units so that the outer peripheral surfaces of the adjacent filter units are partially in contact with each other but at least a part of the upper surfaces and/or the lower surfaces of the adjacent filter units are spaced apart from each other, and then melting a bonding resin so as to cause the melted bonding resin to flow into a gap between the spaced upper surfaces and/or a gap between the spaced lower surfaces and to cure.

7. The method of manufacturing a filter unit panel according to claim 6, wherein
the plurality of filter units, each having an engaging portion including a convex portion and/or a concave portion on the outer peripheral surface, are prepared, and
the plurality of filter units are disposed with the engaging portions of the adjacent filter units being engaged in contact with each other, and then the bonding resin is melted so as to cause the melted bonding resin to flow into the gap between the spaced upper surfaces and/or the gap between the spaced lower surfaces.

8. The method of manufacturing a filter unit panel according to claim 6, wherein
the plurality of filter units, each having a protruding portion made of resin on the upper surface and/or the lower surface, are prepared, and
the protruding portion made of resin is melted so as to cause the melted protruding portion as the bonding resin to flow into the gap between the spaced upper surfaces and/or the gap between the spaced lower surfaces.

9. The method of manufacturing a filter unit panel according to claim 6, wherein
the plurality of filter units, each in which the outer peripheral surface recedes toward the inner peripheral surface gradually from a center portion to end portions of each side of the frame body, are prepared, and
the plurality of filter units are disposed so that the frame bodies of the adjacent filter units are in contact with each other at their center portions but are spaced apart from each other at their end portions, and then the bonding resin is melted so as to cause the melted bonding resin to flow into the gap between the upper surfaces spaced apart at the end portions and/or the gap between the lower surfaces spaced apart at the end portions.

* * * * *